United States Patent [19]

Salter

[11] 4,102,036

[45] Jul. 25, 1978

[54] METHOD OF INSTALLING A SLEEVE BOLT IN AN OPENING

[75] Inventor: Larry Salter, Lakewood, Calif.

[73] Assignee: Paul R. Briles, Inglewood, Calif.

[21] Appl. No.: 815,520

[22] Filed: Jul. 14, 1977

Related U.S. Application Data

[62] Division of Ser. No. 724,412, Sep. 17, 1976.

[51] Int. Cl.² .............................................. B23P 19/02
[52] U.S. Cl. .................................. 29/525; 29/526 R; 85/1 R
[58] Field of Search ............. 29/256, 525, 238, 526 R; 85/1 R, 1 JP; 81/53.2

[56] References Cited

U.S. PATENT DOCUMENTS

| | | | |
|---|---|---|---|
| 2,519,693 | 8/1950 | Olin | 29/256 UX |
| 2,562,419 | 7/1951 | Ferris | 29/256 X |
| 2,916,813 | 12/1959 | Belanger | 29/256 |
| 3,270,410 | 9/1966 | Salter et al. | 85/1 R UX |
| 3,298,725 | 1/1967 | Boteler | 85/1 R X |
| 3,317,228 | 5/1967 | Storch | 85/1 R X |
| 3,727,491 | 4/1973 | Buckwalter | 81/53.2 |
| 3,841,771 | 10/1974 | Shankwitz et al. | 29/256 X |
| 4,015,505 | 4/1977 | Murray | 85/1 JP X |

*Primary Examiner*—Charlie T. Moon
*Attorney, Agent, or Firm*—Singer & Singer

[57] ABSTRACT

This invention describes a system and method for precisely locating a combined sleeve bolt in an opening located in a plurality of materials adapted to be connected together. The adjustable nut is constructed in two parts and rotatably attached to each other. The first part contains an internal thread for accepting one end of the sleeve bolt and a bearing surface for bearing only on one end of the projecting outer sleeve. The second portion of the nut has a greater diameter for bearing against the bottommost portion of the materials adapted to be connected together. The two portions of the nut being independently adjustable allow the sleeve bolt to be positioned within the hole regardless of any variations in the length of the sleeve. Once the desired position is achieved, the two portions are locked together, preferably by a set screw, and the tapered bolt is pulled into the hole while the adjustable nut holds the sleeve in the desired and pre-adjusted position.

3 Claims, 8 Drawing Figures

METHOD OF INSTALLING A SLEEVE BOLT IN AN OPENING

This is a divisional of Ser. No. 724,412 filed on 9-17-76.

This invention relates to a method and system for use with the installation of sleeve bolts which allow the operator to position a sleeve in the opening in any desired predetermined position.

A sleeve bolt is basically an improved fastener used to secure a plurality of plates or other constructural members together so as to reduce fatigue failure in the structural members in the vicinity of the opening.

The sleeve bolt basically consists of a tapered shank having a head at one end and a threaded portion at the other end. The sleeve member of relatively soft material has an internal taper corresponding to the taper on the defined shank. The sleeve is placed over and onto the tapered shank in a predetermined position which results in an interference fit. The outside diameter of the sleeve is made cylindrical and in view of the interference fit between the tapered shank and the tapered sleeve, dimensional tolerances are kept to a minimum and the outside cylindrical diameter of the sleeve can be accurately determined.

The advantages of using sleeve bolts have been the subject matter of many prior patents including but not limited to U.S. Pat. No. 3,693,247 issued Sept. 26, 1972, to Clarence K. Brown, and U.S. Pat. No. 3,270,410 issued Sept. 6, 1966 to the same inventor as the present invention and to a co-inventor Franklin S. Briles.

The sleeve bolt is sold to the industry as a matched unit consisting of the tapered shank and the sleeve partially installed on the tapered shank. The user provides a cylindrical opening into a plurality of materials which are adapted to be connected together and then inserts the sleeve bolt into the opening for final installation.

In order to obtain the maximum benefits of the sleeve bolt it has been recognized that the uppermost portion of the sleeve should be maintained level with the opening during assembly. This is necessary to ensure the proper dimensional fit since driving the tapered shank has the effect of radially expanding the sleeve into the hole thereby obtaining the necessary interference fit.

Since the limiting factor is the distance between the tapered shank and the head, it will be quickly appreciated that if the sleeve is allowed to slip into the hole, then full radial expansion of the sleeve will not take place and, further, should the sleeve not protrude into the hole, then an excessive amount of expansion of the sleeve will take place and, further, there will be an interference between that portion of the sleeve protruding from the opening and the head which will interfere with the proper penetration and expansion of the sleeve. In either event, the predetermined expansion of the sleeve will not take place and the holding power of the combined sleeve bolt will be less than optimum which in critical installation areas such as airplane construction is an intolerable condition.

The construction and tolerance control of the combined tapered shaft head and sleeve combining the complete sleeve bolt is accurately controlled by the manufacturer. Unfortunately, the thickness of the individual stack-up materials that the customer seeks to connect together will vary due to variations in tolerance. This variation in thickness is an unknown condition and hence the manufacturer of the sleeve bolts attempts to provide an excess length of bolt and sleeve length in order to accommodate known and unknown variations in thickness tolerances of plates of materials comprising the stack-up being connected together. The length of the sleeve must be longer than the length of the hole in order to provide full bearing interference throughout the complete length of the hole.

This unknown thickness of plate materials results in a sleeve length that is usually in excess of the amount needed for any given installation. It is this excess of sleeve length that creates certain problems in the final installation of the combined sleeve bolt.

At the present state-of-the-art it is considered most desirable and preferable to position the top of the sleeve level with the top of the stack-up being connected together. It is conceivable that for different installations the position of the sleeve will be varied, however, the present invention is concerned primarily with locating the sleeve in any desired position relative to the opening in the stack-up and for the purposes of this invention the installation nut will be described to provide an installation sleeve bolt in which the sleeve is maintained with the uppermost portion of the sleeve level with the uppermost portion of material forming the defined stack-up.

The sleeve bolt installation nut consists of a first hollow cylindrical member having a wrench surface on one end and a butting surface at the other end for contacting the bottommost portion of the sleeve when positioned on the tapered shank. The first cylindrical member has external threads on a portion of the external surface and internal threads for accepting the threads on the tapered shank.

A second hollow cylindrical member has internal threads for mating with the external threads on the first member and also contains a butting surface at one end for contacting the bottommost surface of the materials being connected together. A set screw is used to connect both the first member and the second member together.

The preferred method of utilizing the sleeve bolt installation nut comprises the steps of pre-assembling the two members together so that the internal members on the second member rotate and are threadily engaged with the external threads on the first member.

The sleeve bolt is inserted into the opening located in the materials being connected together and the threaded end of the tapered shank is threaded into the internal threads on the first member until the bearing surface on the first member contacts the bottommost portion of the sleeve.

Then while holding a bearing surface of the second member against the bottommost surface of the material being connected together, it is necessary to rotate the second member while maintaining the first member tapered shank and sleeve stationary until the uppermost portion of the sleeve is in the desired position which is considered to be flush with the uppermost portion of the material being connected together.

In this position the set screw connecting the first and second member together is tightened, thereby locking the first and second member together. The combined lock nut is held against the bottommost portion of the material and rotated in a locking direction thereby drawing the tapered shank into the sleeve while at the same time the sleeve is held in the desired position during the pulling operation on the shank. The process is completed until the head of the shank contacts the material, at which time the installation nut may be removed and a conventional washer and counterbore nut is installed.

Further objects and advantages of the present invention will be made more apparent as the description progresses, reference now being made to the accompanying drawings wherein.

Figure 1:
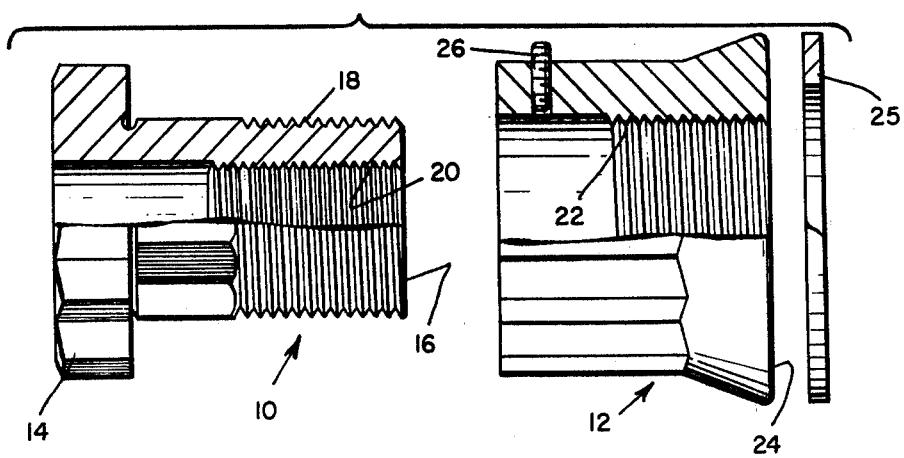
FIG. 1 illustrates a partial cross-section of the first and second member forming the sleeve bolt installation nut.

Referring now to FIG. 1, there is shown a partial cross-section of the first part 10 and the second part 12 which form the complete sleeve bolt installation nut.

The first part 10 is comprised of a hollow cylindrical member having a wrench surface 14 at one end and a butting surface 16 at the other end. The cylindrical butting surface 16 is adapted to contact the bottommost portion of the sleeve when positioned on the tapered bolt.

The first part 10 is basically cylindrical in shape and contains external threads 18 on the external surface and internal threads 20 adapted to accept and hold the external threads on the end of the tapered shank.

A review of the second part 12 will show the hollow cylindrical member having internal threads 22 adapted to mate and threadily engage with the external threads 18 on the first part 10. A butting surface 24 having a diameter greater than the external diameter of threads 18 on the first part 10 is adapted to contact the bottommost surface of the stacked materials being connected together. In the preferred embodiment a washer 25 is inserted between surface 24 and the stacked material being connected together to prevent damage during nut rotation to the surface. A set screw 26 is located on the second part 12 and adapted to contact and align the second part so as to contact the first part 10 and hold the first part and second part together for mutual receipt of a single wrench after the adjustment has been completed.

In the preferred embodiment and method of use, the second part 12 is threadily engaged onto the first part 10 in such a way that the external threads 18 are threadily engaged with the internal threads 22 and in a position which allows the butting surface 24 to face outward so as to contact the bottommost surface of the stack-up of materials being connected together.

Figure 2:
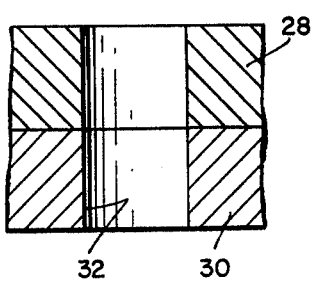
FIG. 2 illustrates a stack-up of two materials having a cylindrical opening and adapted to be connected together.

Referring now to FIG. 2, there is shown a stack-up of materials 28 and 30 that are adapted to be attached together. A cylindrical opening 32 has been placed in the stack-up of materials 28 and 30 and is adapted to receive the sleeve bolt.

Figure 3:
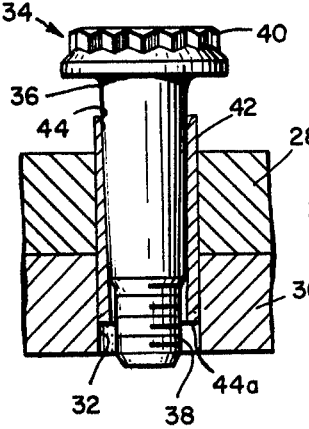
FIG. 3 illustrates a sleeve bolt inserted into an opening in a stack-up of materials.

Referring now to FIG. 3, there is shown a sleeve bolt 34 consisting of a tapered shank 36 having a threaded portion 38 at one end and a head portion 40 at the other end. A sleeve member 42 having a tapered internal diameter and a cylindrical outside diameter has been fitted onto the tapered shank 36.

In the preferred embodiment the sleeve bolt 34 is a unique combination of the tapered shank 36 and the tapered sleeve 42. The sleeve 42 has been inserted on the tapered shank 36 and radially expanded so as to remove and eliminate all interference tolerances existing between the internal diameter of the sleeve and the external diameter of the tapered shank. The external diameter of the sleeve 42 has been reduced to a dimensional tolerance that is closely controlled and which allows the user great precision in selecting the outside diameter of sleeve bolt for use in the cylindrical opening. The combined sleeve bolt 34 will slide and may be placed in any position in the opening 32; however, the desired position is for the uppermost portion of the sleeve 44 to be flush with the uppermost surface of material 28.

Figure 4:
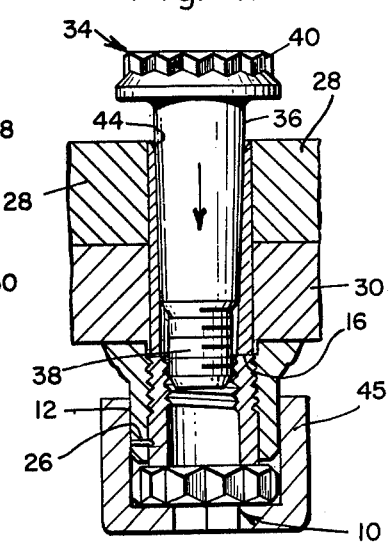
FIG. 4 illustrates a sleeve bolt attached to a sleeve bolt installation nut and adjusted to the desired position before installation.

Referring now to FIG. 4, there is shown an illustration showing the combined installation nut consisting of first part 10 and second part 12 threaded together so that external threads 18 on part 10 threadily engage with internal threads 22 on part 12.

The internal threads 20 of part 10 are threaded onto threads 38 located at one end of the tapered shank 36. The first part 10 is threaded as far as possible until the butting surface 16 of the first part 10 contacts the end portion 44a of the sleeve member 42. A review of FIG. 4 will show that the sleeve member 42 is illustrated as being larger than the length of the opening 32 and in fact protrudes below material 30.

In this position the second part 12 is placed with the butting surface 24 against material 30 and then rotated until the uppermost portion 44 of the sleeve member 42 is flush with material 28. This position is illustrated in FIG. 4. In this position set screw 26 is tightened thereby locking the first part 10 and the second part 12 together.

The installation nut has now been preset and adjusted for the thickness of the materials 28, 30 and for the length of the sleeve member 42 on that batch of sleeve bolts being used to attach materials 28 and 30 together. It is envisioned that the adjustment just made can be used to complete the assembly of all sleeve bolts being used to connect materials 28 and 30.

In the preferred embodiment the periphery of both the first part 10 and second part 12 have multiple wrenching elements 14. A single socket wrench 45 is placed over both parts 10 and 12 and used to install the tapered shank 36 while the sleeve member 42 is held in position.

Figure 5:
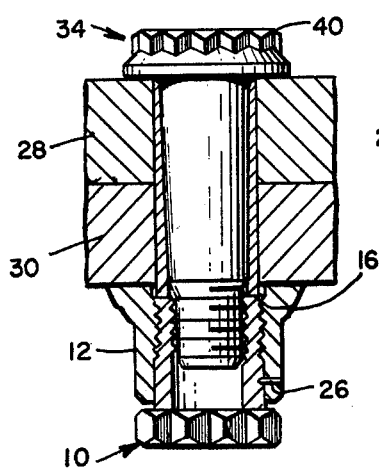
FIG. 5 illustrates a sleeve bolt completely installed in a cylindrical opening using the defined installation nut.

Referring now to FIG. 5, there is shown the sleeve bolt 34 completely installed as a result of a wrench being applied to the installation nut consisting of the first part 10 and second part 12 being rotated in unison by means of external wrenching means. Rotating the installation nut has the effect of drawing the tapered shank 36 in a downward direction into the internal threads 20 located on first part 10. At the same time butting surface 16 is held in contact with end portion 44a of the sleeve member 42 thereby preventing the sleeve member from being moved axially while the tapered shank 36 is pulled axially into position. The final position and limiting position is when the shoulder forming head 40 abuts against the material 28. At this point the installation of the sleeve bolt is complete with the sleeve member 42 held in position and caused to radially expand under the action of the tapered shank 36 being drawn into position by the rotating installation nut 10 and 12.

Figure 6:
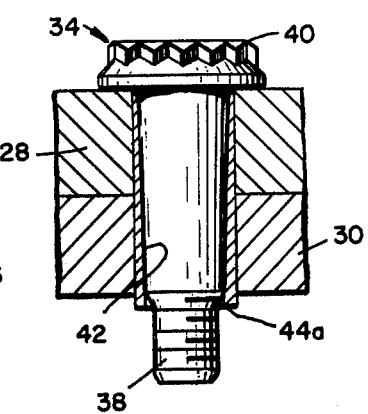
FIG. 6 illustrates an installed sleeve bolt after the installation nut has been removed.

A review of FIG. 6 will illustrate the stack-up of surfaces 28 and 30 connected together by means of the installed sleeve bolt 34. In this illustration the installation nut comprising parts 10 and 12 has been removed. The end portions 44 of the sleeve member 42 is shown projecting below material 30 since we have indicated that the length of the sleeve member 42 is longer than the length of the cylindrical opening 32 located in the materials 28 and 30.

Figure 7:
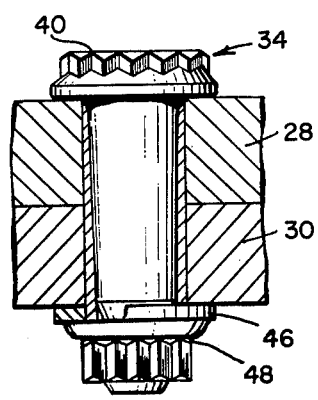
FIG. 7 illustrates a sleeve bolt fully installed with a washer and lock nut in place.

Referring now to FIG. 7, there is illustrated a conventional washer 46 having an enlarged internal diameter so as not to contact or interfere with the projection of the sleeve member 42. Located on the threads 38 of the projecting tapered shank 36 is a nut 48 which bears in conventional fashion against washer 46 so as to complete the installation of the sleeve bolt in the opening 32.

It will be appreciated by those skilled in the art that the basic principles of the present invention can be adapted to automatic machinery for installing the sleeve bolt.

Figure 8:
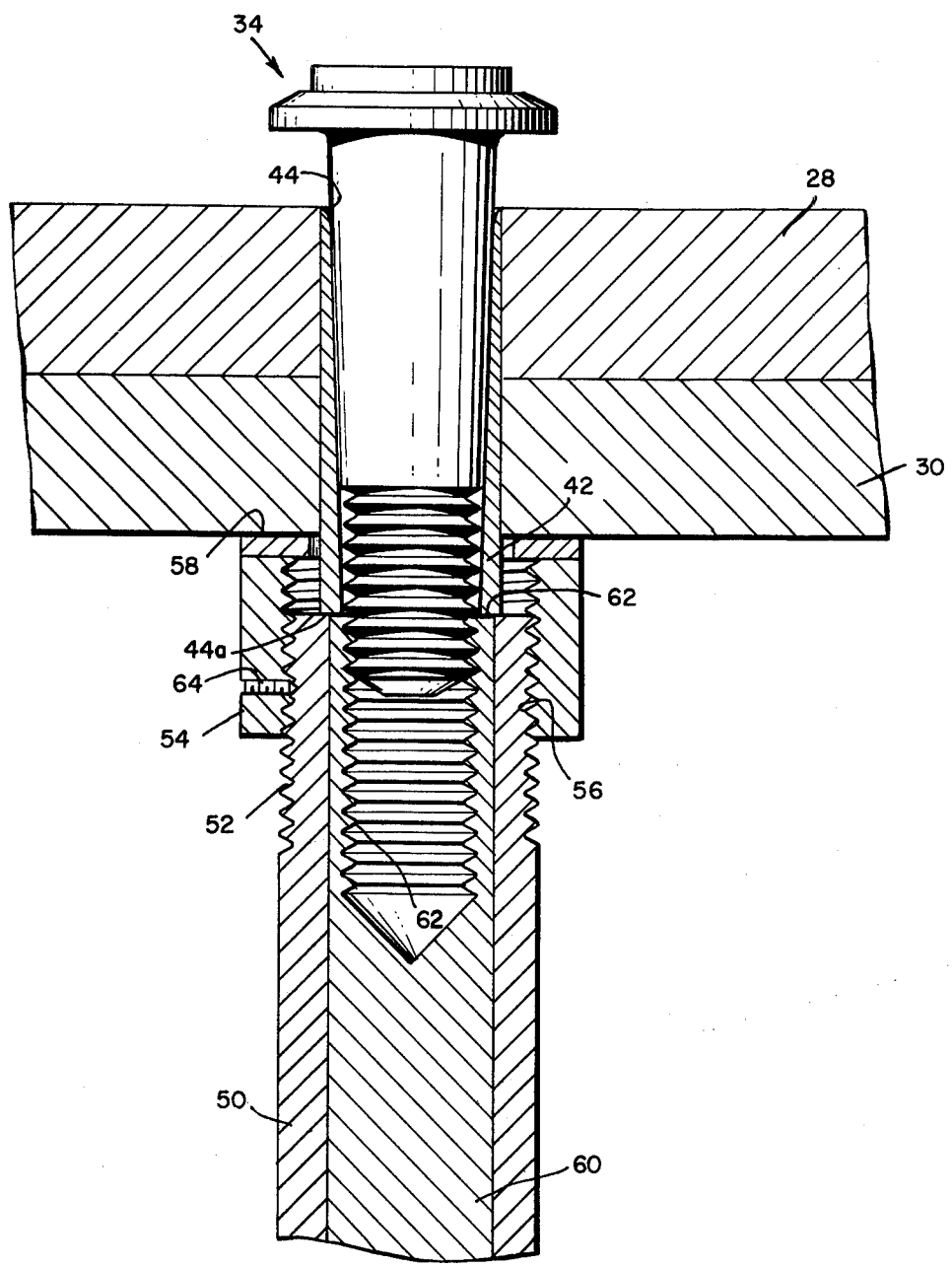
FIG. 8 illustrates a sleeve bolt installation adaptor for use with an automatic axial pull gun.

For example, referring now to FIG. 8, there is shown a sleeve bolt 34 inserted into a stack-up of materials 28 and 30.

The automatic machinery used to install the sleeve bolt comprises an external member 50 such as outer portion of flexible shaft pull gun barrel having external threads 52. Located on the external thread portion 52 is a hollow cylindrical member 54 having internal threads 56 adapted to mate with the external threads 52 of member 50. Cylindrical member 54 has a bearing surface 58 adapted to bear against the bottommost member 30 forming the two materials being connected together.

Centrally located within member 50 is a movable member 60 such as rotatable cable or actuating piston connected at the far end to a hydraulic source for locking on bolt and moving member 60 in a lateral direction. Located at the present end of member 60 is a threaded portion 62 capable of accepting the external threads 38 located on the end of the tapered shank 36. The internal diameter of member 50 is greater than the external diameter of threads 38 but less than the external diameter of sleeve member 42 thereby providing an abutting surface 62 which clears the threads 38 but abuts against end portion 44a of the sleeve member 42.

The cylindrical member 54 is adjusted so that the top end 44 of the sleeve member 42 is made level with the surface 28. A set screw 64 is then used to lock cylindrical member 54 with member 50. At this point in time member 60 is energized and the sleeve bolt shank is pulled in place while the sleeve member is prevented from moving.

It will be obvious to those skilled in the art that many other automatic devices may be used to install the sleeve bolt using the principles of the installation nut.

I claim:

1. A method for installing a tapered shank and mating sleeve in a cylindrical opening located in a plurality of materials adapted to be connected together and comprising the steps of, pre-assembling a two part installation nut in which the first member has external threads for mating with internal threads on the second member, then threading internal threads on the first member onto the external threads located on the end of the tapered shank until the end surface of the first member abuts against one end of the projecting sleeve, then while holding a bearing surface of the second member against the bottommost surface of the material being connected together, rotating the second member until the sleeve is positioned in the cylindrical opening in a desired position, then locking the first member and second member together, and then while holding the second member against the material, pulling the tapered shank into the opening while at the same time holding the sleeve in the desired position in the opening until the sleeve has been radially expanded.

2. A method according to claim 1 in which the tapered shank is pulled axially within the mating sleeve while the sleeve is held in position and is radially expanded by the insertion of the tapered shank.

3. A method according to claim 1 in which the installation nut is removed after assembly and a washer and lock nut is installed to complete the anchoring of the tapered shank.

* * * * *